United States Patent

[11] 3,624,411

[72] Inventor Balthasar H. Pinckaers
Edina, Minn.
[21] Appl. No. 21,570
[22] Filed Mar. 23, 1970
[45] Patented Nov. 30, 1971
[73] Assignee Honeywell Inc.
Minneapolis, Minn.

[54] SWITCHING CIRCUIT FOR DELAYED PHASE FIRING OF A POWER SWITCH
11 Claims, 2 Drawing Figs.

[52] U.S. Cl. .......... 307/252 W, 307/262, 307/284, 323/22 SC
[51] Int. Cl. .......... H03k 17/72
[50] Field of Search .......... 307/252 R, 252 B, 252 G, 252 J, 252 M, 252 N, 252 T, 252 W, 238, 240, 273, 284, 274, 262; 328/31, 100, 151, 171, 172

[56] References Cited

UNITED STATES PATENTS

| | | | |
|---|---|---|---|
| 3,244,965 | 4/1966 | Gutzwiller | 307/252.90 X |
| 3,243,711 | 3/1966 | King et al. | 307/252.73 X |
| 3,360,713 | 12/1967 | Howell | 307/252.90 X |
| 3,392,626 | 7/1968 | Miller et al. | 307/252.21 X |

OTHER REFERENCES

Metal Products Manufacturing, pg. 39, Fig. at top of page, 7/1964.

G.E. SCR Manual, 4th Edition, pp. 197- 198, 1967.

*Primary Examiner*—Stanley D. Miller, Jr.
*Assistant Examiner*—L. N. Anagnos
*Attorneys*—Lamont B. Koontz and Alfred N. Feldman

ABSTRACT: A control system is provided for energizing an electrical load in the form of a spark ignition transformer so that the load is energized for a portion of each half-wave of the applied alternating current voltage. The control circuit utilizes a Zener diode and transistor switch to keep the load deenergized during the major and initial portion of each half-cycle of the applied voltage and then switches the load on during the remaining portion of the applied voltage. The switch, in the form of a silicon-controlled rectifier, allows conduction through the spark ignition transformer primary for a portion of each half-wave of the line voltage.

INVENTOR.
BALTHASAR H. PINCKAERS
BY Alfred N. Feldman
ATTORNEY.

SWITCHING CIRCUIT FOR DELAYED PHASE FIRING OF A POWER SWITCH

BACKGROUND OF THE INVENTION

When circuits for firing solid state power switches such as the silicon controlled rectifier and triac are applied to step-up transformers for spark ignition, a problem arises in controlling the power to the primary of the transformer in order to make the transformer design practical. As a result of this, it is desirable to be able to apply only a selected amount of power to the primary for a short period of time and this requires phase firing of a silicon-controlled rectifier or triac only for a selected portion of the applied voltage. In order to accomplish this a circuit must be provided which is capable of disregarding the initial rise of the applied wave form, but this is quite difficult as most circuits are responsive to voltage and therefore are not directly applicable of this type of control.

SUMMARY OF THE INVENTION

The present invention is directed to a phase firing circuit that is capable of ignoring or disregarding the rising voltage portion of the applied wave form to a power switch, such as a silicon-controlled rectifier or triac, yet which responds to a predetermined voltage which occurs after the peak of the wave form. This is accomplished by providing a switching circuit means that has a Zener diode in its input and which has a current control means make up of a pair of transistors that respond to different parts of the applied waveform. During the rising portion of the applied voltage waveform, current is supplied through one of the transistors to a capacitor or energy storage means in a slow enough manner such that the gate input received by an output silicon-controlled rectifier is insufficient to trigger it into conduction. When the instantaneous value of supply voltage reaches a certain value, as determined by a zener diode, the other transistor conducts and the first transistor is regeneratively turned off. When the voltage subsequently falls sufficiently to drop below the Zener breakdown potential, the transistor circuitry again switches and a pulse of energy is supplied to the gate circuit of the silicon-controlled rectifier to bring it into full conduction. The silicon-controlled rectifier conducts until the current falls to zero and then it is automatically extinguished. This sequence is repetitively followed on each half cycle thereby delivering a well-defined small quantity of electrical energy to the primary of a spark igniter type of transformer. Moreover, this happens at a well-defined value of supply voltage after the peak value of the supply voltage has passed.

DESCRIPTION OF THE PREFERRED EMBODIMENT

Figure 1:
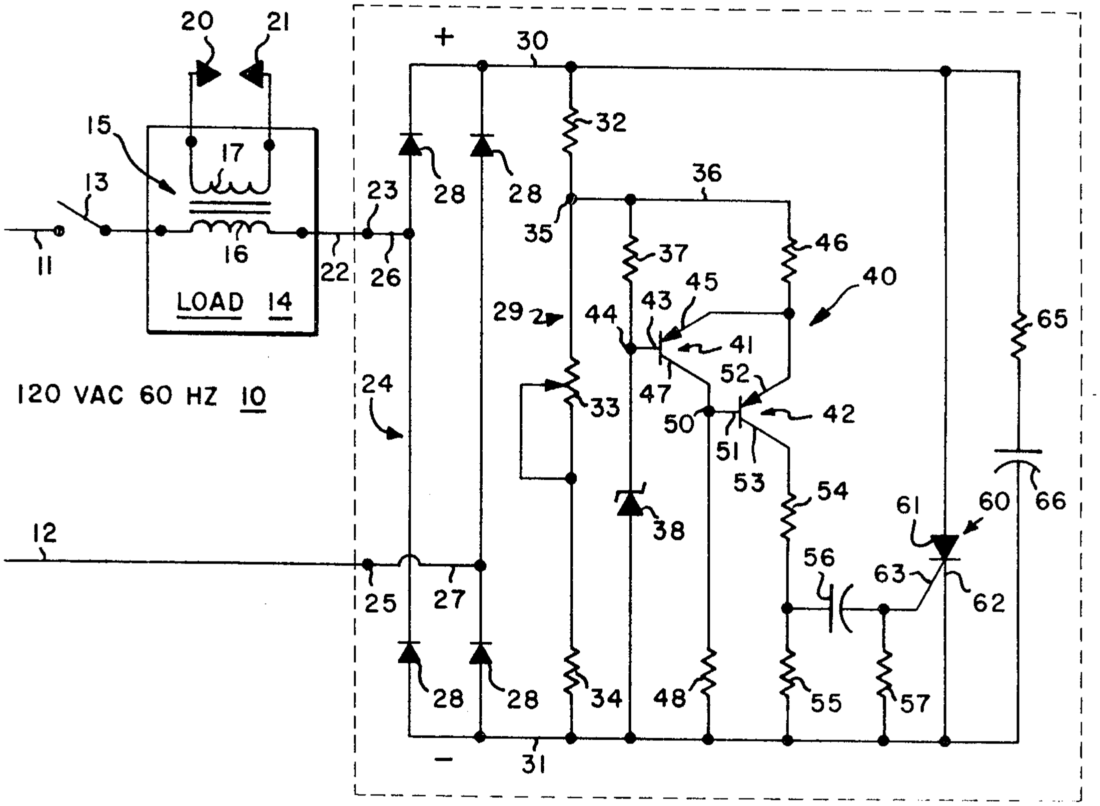
FIG. 1 is a schematic representation of a complete system.

A conventional line voltage 10 is connected to conductors 11 and 12 to supply an alternating current voltage through a switch or controller 13 to a load means 14. The load means 14, in the particular case disclosed is a transformer 15 having a primary winding 16 connected in series with the line 11 and switch 13. The transformer 15 has a secondary winding 17 connected to a pair of electrodes 20 and 21 for the generation of a spark for ignition in a burner system. The present invention is particularly useful in energizing the load means 14 of the type disclosed but is not limited thereto. The load means 14 can be any form of electrical load to which a controlled or limited amount of electrical energy is to be delivered for relatively short intervals of time during each one-half cycle of the applied line voltage.

The primary winding 16 is further connected by conductor 22 to a terminal 23 that forms one input terminal for the circuit means generally disclosed at 24. A further terminal 25 of the circuit means 24 is connected to conductor 12 to complete the application of line voltage 10 to the circuit means 24. The terminals 23 and 25 are connected via conductors 26 and 27 to a full-wave bridge means or rectifier means which includes four diodes 28. The full-wave rectifier bridge means supplies a positive potential on conductor 30 and a negative potential on conductor 31 as is well known in the art. Connected across the conductors 30 and 31 is a voltage divider network made up of resistor 32, potentiometer 33, and resistor 34. The potentiometer 33 and resistor 34 could be combined into a single resistor if no adjustment of the operation of the circuit means 24 is desired.

A junction between the resistor 32 and the potentiometer 33 is noted at 35 and supplies a positive potential to conductor 36 of a switching circuit means 29. The potential on conductor 36 is applied through a resistor 37 and a Zener diode 38 to form an input means for a current control means 40 which is part of the switching circuit means 29. The current control means 40 includes a pair of transistors 41 and 42 which are differentially connected so that when transistor 41 is conducting transistor 42 is off and vice versa. The input of transistor 41 at the base 43 is connected at 44 to the junction of the Zener diode 38 and the resistor 37. The emitter 45 of transistor 41 is connected through a resistor 46 to the conductor 36 to receive current which then flows out of collector 47 to a resistor 48 which is connected to conductor 31. A junction 50 between the collector 47 and the resistor 48 is connected to a base 51 of the transistor 42 to control the transistor 42 which has a current path through an emitter 52 to a collector 53 and through a pair of resistors 54 and 55. A small energy storage means 56, in the form of a capacitor, is connected in series with a resistor 57 which are connected across the resistor 55 and form part of a current control output means for switching circuit means 29.

A silicon-controlled rectifier 60 having an anode 61 and a cathode 62 connected across the conductors 30 and 31 is provided along with a gate connection 63 that connects to the junction of the capacitor 56 and the resistor 57 to receive a signal in the output means of the current control means 40 to cause the silicon-controlled rectifier 60 to be conductive. The silicon-controlled rectifier 60 could be any type of power switch means such as a triac, thyratron, or similar type of device. The circuitry is completed by the addition of a resistor 65 and a series capacitor 66 which are connected across the anode 61 and the cathode 62 of the silicon-controlled rectifier 60 for suppression of radio frequency noises and more importantly prevent triggering of silicon-controlled rectifier 60 by line transients.

Figure 2:
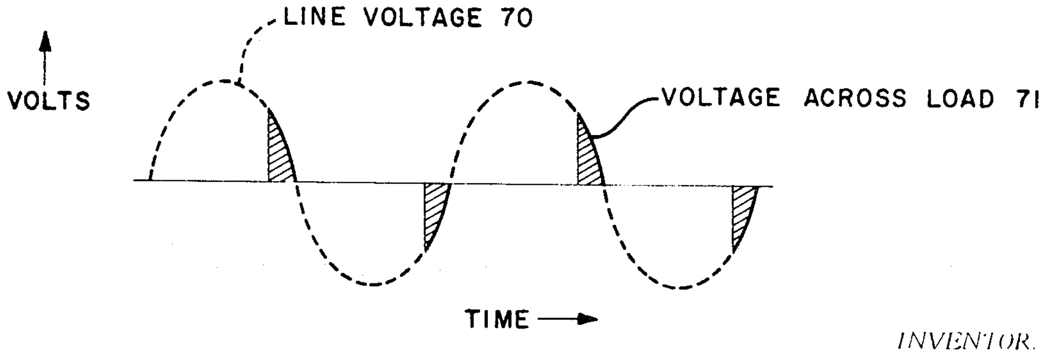
FIG. 2 is a voltage-time graph o the applied voltage across the load showing in its shaded portion the period during which energy is supplied to the primary of the voltage step-up transformer or other load.

In FIG. 2 there is disclosed a voltage versus time graph of the voltage across the line and the voltage across the load means 14. The line voltage 70 is a conventional sine wave while the voltage across the load means 14 is designated at 71. The circuitry of the present invention provides a means of holding the conduction of the silicon-controlled rectifier 60 in an "off" state until after the peak value of the applied line voltage 70. The silicon-controlled rectifier is turned on at a precise and known value of voltage. This has been indicated by shading in the voltage 71 which appears across the load means 14. With this arrangement short bursts of electrical energy are applied to the load 14 which are in this case converted in the secondary 17 of the transformer 15 to a substantially higher voltage to be applied as a spark across the electrodes 20 and 21. The manner in which this is accomplished by the circuit of FIG. 1 will be outlined below.

OPERATION

When the switch 13 is closed to apply energy to the present system and the line voltage 70 begins to rise, the full wave bridge made up of diodes 28 conducts to provide a direct current voltage between conductors 30 and 31. This voltage begins to slowly rise and current begins to flow through the resistor 32 and the conductor 36 to the resistor 46. With the configuration of transistors 41 and 42 disclosed as the current control means 40, current is allowed to flow in the emitter and collector circuit of the transistor 42 through the resistors 54 and 55. This current flow follows the voltage applied to the conductors 11 and 12 and the energy storage means or capacitor 56 charges slowly along with the applied voltage. Consequently, there is insufficient voltage and current transmitted to the gate 63 of the silicon-controlled rectifier 60 which therefore will remain nonconductive. When the voltage at point 35 rises to the breakdown potential of Zener diode 38, the Zener diode 38 begins to conduct thereby causing the transistor 41 to begin conducting. When transistor 41 conducts, it causes a decrease in the base current of transistor 42 and ultimately causes transistor 42 to be turned "off" regeneratively due to the action of resistor 46. The Zener diode 38 selected for the present circuit has a breakdown voltage of approximately 20 volts.

After the line voltage 70 has peaked and has fallen to approximately 20 volts, the Zener diode 38 ceases to conduct thereby turning "off" the conduction path for the transistor 41. When the transistor 41 is progressively taken out of conduction, the transistor 42 regeneratively starts to conduct. At this time a substantial voltage suddenly appears between the collector 53 of transistor 42 and the negative conductor 31 and part or most of this substantial voltage is caused to be developed across resistor 55 and to be transferred through the energy storage means or capacitor 56 to the gate 63 of the silicon-controlled rectifier 60 in the form of a pulse. This drives the silicon-controlled rectifier 60 into conduction and it continues to conduct from that point until the line voltage 10 goes to zero at which time the silicon-controlled rectifier 60 reverts to the nonconductive state. This same function occurs on the reverse half-cycle as the input through the diodes 28 is a full wave bridge and the conductors 30 and 31 have supplied therefrom a normal rectified voltage of the proper polarity to the control circuit.

By properly selecting the value of resistor 33 and the Zener 38 it is possible by choice to apply only the last 25 or 30 degrees of the applied line voltage through the silicon-controlled rectifier 60. Since the silicon-controlled rectifier 60 acts substantially as a short when it is conducting, a substantial amount of current can flow during a small portion of the applied line voltage 70 thereby causing the load means 14 or transformer 15 to generate a substantial spark but with a limited amount of power dissipation.

With the present circuit it is possible to select, through the switching circuit means 29, any desired point of the line voltage 70 after the peak has occurred. This supplies a means of obtaining the operation of a power switch means such as the silicon-controlled rectifier 60 in a completely controlled fashion. The disclosure of the present application is illustrative of a principle of operation of a switching circuit means 24 and in no way is intended to be a limitation of the sole manner in which the present invention can be carried out. The present invention can be implemented by any number of circuit modifications and the applicant wishes to be limited in the scope of his invention solely by the scope of the present claims.

The embodiments of the invention in which an exclusive property or right is claimed are defined as follows:

1. Switching circuit means for controlled operation of power switch means after the passing of the peak of an applied alternating current voltage to the power switch means, including: rectifier means adapted to be connected to load means and an alternating current source means to supply rectified voltage to switching circuit means; said switching circuit means having input means connected to said rectifier means and including voltage breakdown means; switching circuit means further including current control means having input means connected to said voltage breakdown means and output means adapted to be connected to operate said power switch means; and said current control output means including energy storage means; said current control means conducting to cause energy to be stored in said energy storage means upon application of said alternating current voltage until said voltage breakdown device operates to shunt current in said switching circuit means on a rising applied voltage; said switching circuit means operating said current control means to conduct by said applied alternating current voltage falling below the breakdown voltage of said breakdown voltage device to allow a sudden flow of current to said output means that is sufficient to operate said power switch means through said energy storage means.

2. A switching circuit means for controlled operation of power switch means as described in claim 1 wherein said rectifier means is a full-wave rectifier bridge.

3. A switching circuit means for controlled operation of power switch means as described in claim 1 wherein said voltage breakdown means is a Zener diode.

4. A switching circuit means for controlled operation of power switch means as described in claim 1 wherein said current control means includes a pair of regeneratively operated transistors with a first of said pair of transistors connected to allow said sudden flow of current to said power switch means; said other of said pair of transistors connected to shunt current in said switching means.

5. A switching circuit means for controlled operation of power switch means as described in claim 1 wherein said energy storage means is a capacitor.

6. A switching circuit means for controlled operation of power switch means as described in claim 1 wherein said power switch means is a silicon-controlled rectifier having a gate connected to said energy storage means; and said silicon-controlled rectifier having an anode and a cathode connected across said rectifier means.

7. A switching circuit means for controlled operation of a power switch means as described in claim 6 wherein said rectifier means is a full-wave rectifier bridge.

8. A switching circuit means for controlled operation of power switch means as described in claim 7 wherein said current control means includes a pair of regeneratively operated transistors with a first of said pair of transistors connected to allow said sudden flow of current to said silicon-controlled rectifier gate; said other of said pair of transistors connected to shunt current in said switching means.

9. A switching circuit means for controlled operation of power switch means as described in claim 8 wherein said voltage breakdown means is a Zener diode.

10. A switching circuit means for controlled operation of power switch means as described in claim 9 wherein said energy storage means is a capacitor.

11. A switching circuit means for controlled operation of power switch means as described in claim 10 wherein said load means is a primary winding of a spark ignition transformer for generation of ignition sparks for a fuel burner.

* * * * *